United States Patent
Lee et al.

(10) Patent No.: US 9,875,390 B2
(45) Date of Patent: Jan. 23, 2018

(54) METHOD AND APPARATUS FOR RECOGNIZING OBJECT

(71) Applicant: SAMSUNG ELECTRONICS CO., LTD., Suwon-si (KR)

(72) Inventors: Kyoobin Lee, Seoul (KR); Keun Joo Park, Seoul (KR); Eric Hyunsurk Ryu, Hwaseong-si (KR); Jun Haeng Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 14/714,437

(22) Filed: May 18, 2015

(65) Prior Publication Data

US 2016/0203610 A1 Jul. 14, 2016

(30) Foreign Application Priority Data

Jan. 12, 2015 (KR) .................. 10-2015-0004146

(51) Int. Cl.
*G06K 9/00* (2006.01)

(52) U.S. Cl.
CPC ..... *G06K 9/00221* (2013.01); *G06K 9/00255* (2013.01); *G06K 9/00973* (2013.01); *G06K 9/00355* (2013.01)

(58) Field of Classification Search
CPC .......... G06K 9/00221; G06K 9/00255; G06K 9/00973; G06K 9/00355; G06K 9/00234; G06T 7/0042; G06T 7/0065; G06T 7/2033; G06T 2207/30241; G06T 2210/61
See application file for complete search history.

(56) References Cited

U.S. PATENT DOCUMENTS

| | | | |
|---|---|---|---|
| 5,621,519 A * | 4/1997 | Frost .................... | H04N 17/002 348/E17.002 |
| 6,285,712 B1 | 9/2001 | Kondo et al. | |
| 7,227,464 B2 | 6/2007 | Afriat | |
| 8,284,281 B2 | 10/2012 | Verdant | |
| 8,314,867 B2 * | 11/2012 | Barna .................. | H04N 3/1562 348/283 |
| 8,698,092 B2 | 4/2014 | Lee et al. | |
| 2008/0180534 A1 | 7/2008 | Murayama | |
| 2012/0235790 A1 * | 9/2012 | Zhao ..................... | G06F 21/32 340/5.83 |
| 2012/0257789 A1 | 10/2012 | Lee et al. | |

(Continued)

FOREIGN PATENT DOCUMENTS

| | | | | |
|---|---|---|---|---|
| JP | 4617623 B2 | 1/2011 | | |
| KR | 10-2014-0071802 A | 6/2014 | | |
| KR | 20140071802 | * 6/2014 | ............. | G06F 21/00 |

*Primary Examiner* — Amara Abdi
(74) *Attorney, Agent, or Firm* — Sughrue Mion, PLLC

(57) ABSTRACT

A method of recognizing an object includes controlling an event-based vision sensor to perform sampling in a first mode and to output first event signals based on the sampling in the first mode, determining whether object recognition is to be performed based on the first event signals, controlling the event-based vision sensor to perform sampling in a second mode and to output second event signals based on the sampling in the second mode in response to the determining indicating that the object recognition is to be performed, and performing the object recognition based on the second event signals.

20 Claims, 13 Drawing Sheets

(56) References Cited

U.S. PATENT DOCUMENTS

2013/0237280 A1\* 9/2013 Tsau ..................... G06F 1/325
                                                              455/556.1
2013/0335595 A1   12/2013 Lee et al.
2014/0139684 A1\* 5/2014 Binder ................... H04N 5/349
                                                              348/164

\* cited by examiner

METHOD AND APPARATUS FOR RECOGNIZING OBJECT

CROSS-REFERENCE TO RELATED APPLICATION

This application claims priority to Korean Patent Application No. 10-2015-0004146, filed on Jan. 12, 2015, in the Korean Intellectual Property Office, the disclosure of which is incorporated herein by reference in its entirety.

BACKGROUND

1. Field

Methods and apparatuses consistent with exemplary embodiments relate to a method and apparatus for recognizing an object.

2. Description of the Related Art

In mobile devices, consuming a small amount of power in a standby mode and performing various conflicting smart functions in the standby mode are necessities. Accordingly, in the standby mode, a minimum number of sensors and components may be intermittently woken up and perform a function, and a display or a camera module consuming a large amount of power may not be used. Therefore, a general smart function in the standby mode may be limited to use a simple acceleration sensor.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

Exemplary embodiments may provide a function of consuming a small amount of power in the standby mode using an event-based image sensor, unlocking the standby mode by performing face recognition, and unlocking a device through the face recognition at the same time.

The event-based vision sensor may include a plurality of pixels and output an event signal corresponding to a pixel detecting a change in light or a movement of an object among the plurality of pixels. Technology for obtaining an image having a good quality irrespective of speed by adaptively changing time for gathering event information may be provided, in lieu of generating an image by a shutter speed of predetermined time, for example, a general image sensor.

According to an aspect of an exemplary embodiment, there is provided a method of recognizing an object, the method including controlling an event-based vision sensor to perform sampling in a first mode and to output first event signals based on the sampling in the first mode, determining whether object recognition is to be performed based on the first event signals, controlling the event-based vision sensor to perform sampling in a second mode and to output second event signals based on the sampling in the second mode in response to the determination indicating that the object recognition is to be performed, and performing the object recognition based on the second event signals.

The first mode may include a low power mode and the second mode may include a normal power mode.

The controlling of the event-based vision sensor to perform the sampling in the first mode may include at least one of blocking a portion of pixels among pixels included in the event-based vision sensor from performing sampling, and blocking event signals corresponding to the portion of pixels from being externally output from the event-based vision sensor.

The portion of pixels is determined based on a temporal element, a spatial element, or a combination of the temporal element and the spatial element.

The determining of whether the object recognition is to be performed may include measuring a number of the first event signals per unit time, and determining whether the object recognition is to be performed by comparing the number of the first event signals per unit time to a predetermined threshold value.

The determining of whether the object recognition is to be performed may include extracting a feature from the first event signals, and determining whether the object recognition is to be performed by comparing the feature to a predetermined feature.

The determining of whether the object recognition is to be performed may include measuring a number of the first event signals per unit time, comparing the number of the first event signals per unit time to a predetermined threshold value, extracting a feature from the first event signals when the number of the first event signals per unit time is higher than the predetermined threshold value, and determining whether the object recognition is to be performed by comparing the feature to a predetermined feature.

The performing of the object recognition may include determining whether a predetermined condition associated with the second event signals is satisfied, generating an image based on the second event signals when the determining indicates that the predetermined condition is satisfied, and performing the object recognition based on the image.

The determining of whether the predetermined condition is satisfied may include measuring a number of the second event signals, calculating a position relationship among the second event signals, and determining whether the predetermined condition is satisfied by comparing the number of the second event signals to a threshold value determined based on the number of the second event signals and the position relationship.

The determining of whether the predetermined condition is satisfied may include measuring a number of the second event signals, calculating a variance associated with positions of the second event signals, and determining whether the predetermined condition is satisfied by comparing the number of the second event signals to a threshold value determined based on the number of the second event signals and the variance.

The determining of whether the predetermined condition is satisfied may include accumulating and storing the second event signals, calculating a solid level associated with the second event signals based on a result of the accumulating and storing, and determining whether the predetermined condition is satisfied by comparing the solid level to a predetermined threshold value.

The solid level may be a parameter that increases when a number of adjacent event signals corresponding to the second event signals is higher than a predetermined number and decreases when the number of the adjacent event signals corresponding to the second event signals is less than the predetermined number.

The event-based vision sensor may include a plurality of pixels and output an event signal corresponding to a pixel detecting a change in light or a movement of an object among the plurality of pixels.

According to another aspect of an exemplary embodiment, there may be provided an apparatus configured to recognize an object, the apparatus including an event-based vision sensor configured to operate in a first mode and a second mode, a controller configured to control whether the event-based vision sensor operates in the first mode or the second mode, and a processor configured to determine whether object recognition is to be performed based on first event signals output from the event-based vision sensor when the controller controls the event-based vision sensor to operate in the first mode and perform the object recognition based on second event signals output from the event-based vision sensor when the controller controls the event-based vision sensor to operate in the second mode.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
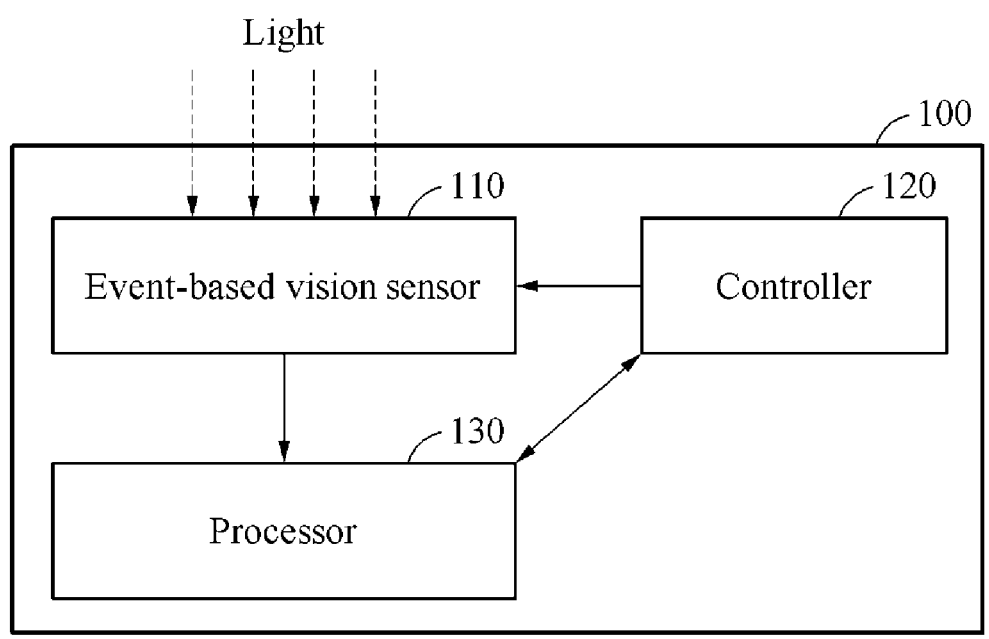
FIG. 1 is a block diagram illustrating an object recognition apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Exemplary embodiments to be described hereinafter may be applicable to recognize an object and used for various devices and apparatuses such as smartphones, personal computers, laptop computers, tablet computers, televisions, smart appliances, intelligent vehicles, kiosks, and wearable devices to which a low power mode and a verification function are required.

FIG. 1 is a block diagram illustrating an object recognition apparatus according to an exemplary embodiment. Referring to FIG. 1, an object recognition apparatus 100 according to an exemplary embodiment may include an event-based vision sensor 110, a controller 120, and a processor 130. The controller 120 and the processor 130 may be provided in a software module, a hardware module, and a combination thereof.

The event-based vision sensor 110 may include a pixel array. Each pixel included in the pixel array may detect a change in light incident to a relevant pixel. Hereinafter, the change in light may be a change in an intensity of light. Also, an operation in which the event-based vision sensor 110 detects the change in incident light may be referred to as sampling. The event-based vision sensor 110 may output an event signal corresponding to the pixel in which the change in light is detected. The event signal may include information, for example, a pixel coordinate, a pixel index, and the like, indicating the pixel that detects the change in light.

Unlike a frame-based vision sensor to scan all pixels included in the pixel array in a frame unit, the event-based vision sensor 110 may output the event signal using the pixel detecting the change in light. When an event is detected, for example, an event in which a light is illuminated or dimmed in a predetermined pixel, the event-based vision sensor 110 may output an ON event signal or an OFF event signal corresponding to a relevant pixel.

The event-based vision sensor 110 may output the event signal by detecting a movement of an object. The object may be a subject. The change in light incident to the event-based vision sensor 110 may result from the movement of the object. For example, when a light source is assumed to be fixed and an object is assumed not to spontaneously emit light, the light incident to the event-based vision sensor 110 may refer to light generated from a light source and reflected off the object. When the object does not move, a change of the light incident to the event-based vision sensor 110 may not occur because there are no substantial changes in the light reflected off the stationary object. Conversely, when the object moves, the change of the incident light incident to the event-based vision sensor 110 may occur because the light reflected off the object changes based on the movement of the object.

The controller 120 may control a mode of the event-based vision sensor 110. The event-based vision sensor 110 may operate in a first mode and a second mode. The first mode may correspond to a low power mode and the second mode may correspond to a normal mode (e.g., normal power mode).

The controller 120 may control the event-based vision sensor 110 so that the event vision sensor operates in the first mode corresponding to the low power mode. An operation in which the event-based vision sensor 110 detects a change in light in the first mode may be referred to as sub-sampling. Event signals output by the event-based vision sensor 110 based on a result of the sub-sampling may be referred to as first event signals.

Figure 2:
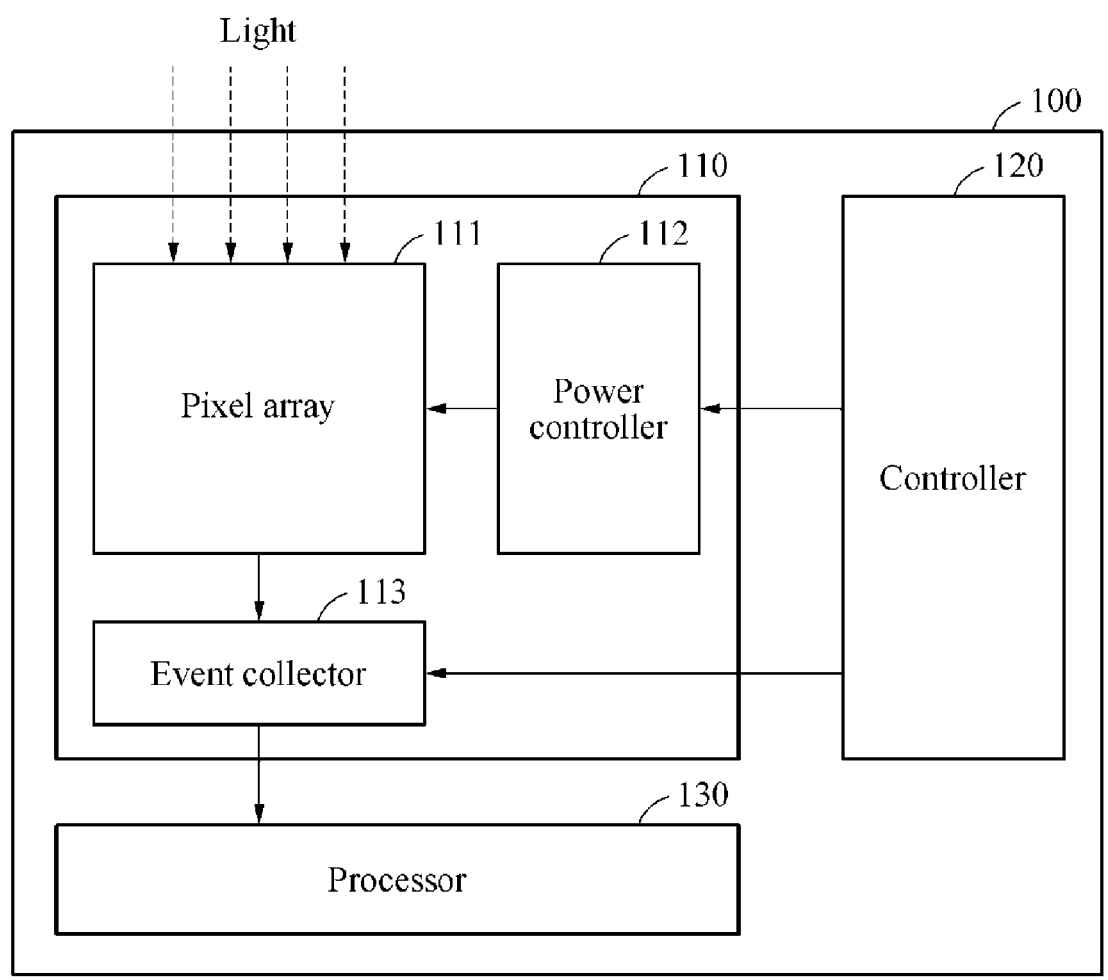
FIGS. 2, 3A, 3B, 3C and 3D are diagrams illustrating an operation of a controller according to exemplary embodiments.

Referring to FIG. 2, the event-based vision sensor 110 may include a pixel array 111, a power controller 112, and an event collector 113. The controller 120 may control the power controller 112 and/or the event collector 113 so that the event-based vision sensor 110 operates in the first mode.

According to an exemplary embodiment, the controller 120 may block at least one portion of pixels included in the pixel array 111 from performing sampling using the power controller 112. For example, the controller 120 may control the power controller 112 to block power supplied to at least one portion of pixels included in the pixel array 111. The pixels of which the power is blocked may not perform sampling.

The power controller 112 may receive a control signal from the controller 120 and control a bias voltage applied to each pixel included in the pixel array 111 based on the control signal. For example, when a control signal indicating a first mode is received from the controller 120, the power controller 112 may apply a voltage drain drain (VDD) voltage to a gate of a p-type metal oxide semiconductor (PMOS) transistor for at least one portion of pixels included in the pixel array 111 and apply a ground (GND) voltage to a gate of an n-type metal oxide semiconductor (NMOS) for the corresponding pixels.

The event-based vision sensor 110 may perform sampling using a portion of the pixels included in the pixel array 111 so that the event-based vision sensor 110 may operate in low power.

According to another exemplary embodiment, the controller 120 may block event signals corresponding to at least one portion of pixels included in the pixel array 111 from being externally output, using the event collector 113. For example, the controller 120 may control the event collector 113 not to transfer the event signals corresponding to at least one portion of pixels included in the pixel array 111 to the processor 130.

When a change in light is detected in a predetermined pixel included in the pixel array 111, the predetermined pixel may generate a sensor signal indicating that the change in light is detected. The event collector 113 may receive the sensor signal and output an event signal corresponding to the pixel generating the received sensor signal to the processor 130.

When a control signal indicating a first mode is received from the controller 120, although sensor signals are received from at least one portion of pixels included in the pixel array 111, the event collector 113 may not output event signals corresponding to relevant pixels to the processor 130.

As a result, dynamic power consumed for outputting an event signal may decrease. Also, computing power for processing the output event signal may decrease.

According to still another exemplary embodiment, the controller 120 may control the power controller 112 and the event collector 113 so that the event-based vision sensor 110 operates in the first mode. Since those skilled in the art will understand the operation of controlling the power controller 112 and the event collector 113 based on the aforementioned descriptions, repeated descriptions will be omitted for conciseness.

Figure 3A:
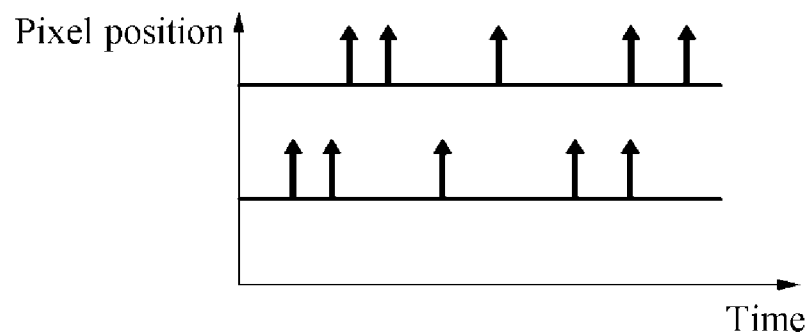
Figure 3B:
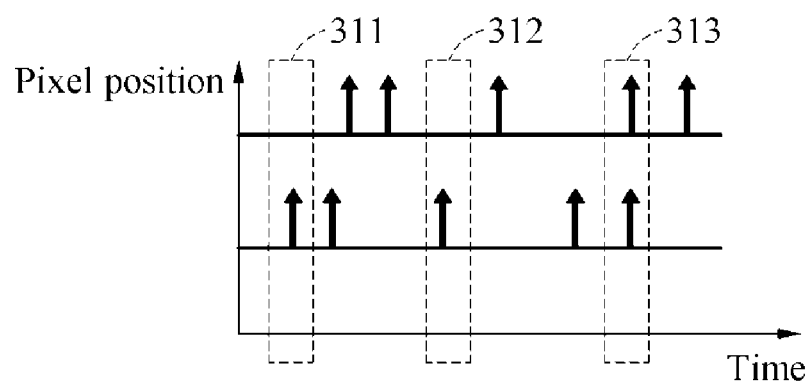

At least one portion of pixels to be controlled in the first mode may be determined based on various methods. FIG. 3A is a graph illustrating sensor signals generated by pixels at different positions as time elapses. Referring to FIG. 3B, at least one portion of pixels to be controlled in the first mode may be determined based on a temporal element. For example, all pixels may be determined to be controlled at a first time interval 311, a second time interval 312, and a third time interval 313. In this example, samplings of all pixels are blocked at the first time interval 311, the second time interval 312, and the third time interval 313 or outputs of event signals corresponding to all pixels may be blocked. The first time interval 311, the second time interval 312, and the third time interval 313 may be set in various forms, such as a predetermined cycle, a dynamically updatable cycle, or a random cycle. When a form of an object is determined based on sub-sampling, the temporal element may be used to determine at least one portion of pixels.

Figure 3C:
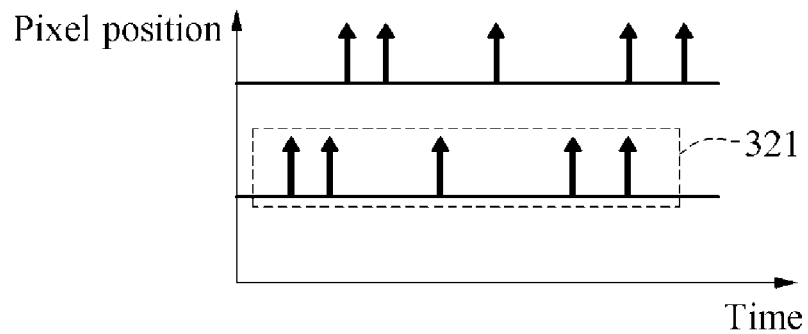

Referring to FIG. 3C, at least one portion of pixels to be controlled in the first mode may be determined based on a spatial element. For example, a pixel or pixels corresponding to a first pixel position 321 may be determined to be controlled. In this example, samplings of the pixel or the pixels corresponding to the first pixel position 321 may be blocked or outputs of event signals corresponding to the pixel or the pixels corresponding to the first pixel position 321 may be blocked. The first pixel position 321 may be set in various forms, such as a predetermined position, a predetermined column, a predetermined line, and the like. When a fast moving object is detected based on sub-sampling, the spatial element may be used to determine at least one portion of pixels.

Figure 3D:
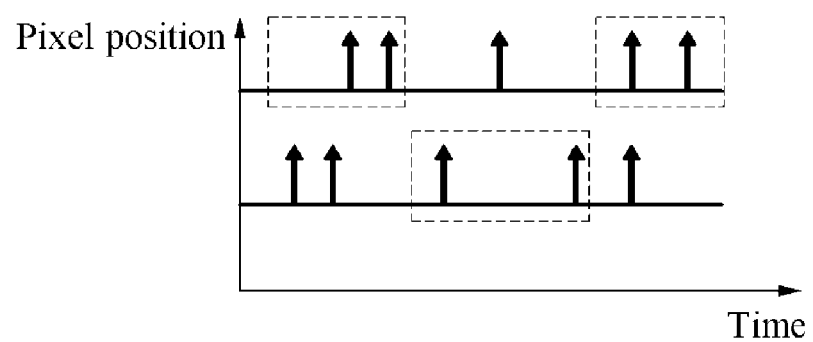

Referring to FIG. 3D, at least one portion of pixels to be controlled in the first mode may be determined based on a combination of the temporal element and the spatial element. Since those skilled in the art will understand the method of combining the temporal element and the spatial element based on the aforementioned descriptions, repeated descriptions will be omitted for conciseness.

Referring back to FIG. 2, the controller 120 may control the event-based vision sensor 110 so that the event-based vision sensor 110 operates in a second mode corresponding to a normal mode. For example, in the second mode, the controller 120 may control the power controller 112 and the event collector 113 to operate in the normal mode. In the second mode, an operation in which the event-based vision sensor 110 detects the change in light in the second mode may be referred to as full-sampling, and the event signals output by the event-based vision sensor 110 based on a result of full-sampling may be referred to as second event signals.

The processor 130 may recognize an object based on event signals output from the event-based vision sensor 110. For example, the processor 130 may determine whether object recognition is to be performed based on the first event signals, and perform the object recognition based on the second event signals. Hereinafter, detailed descriptions related to an operation of the processor 130 will be provided with reference to FIGS. 4 through 9.

Figure 4:
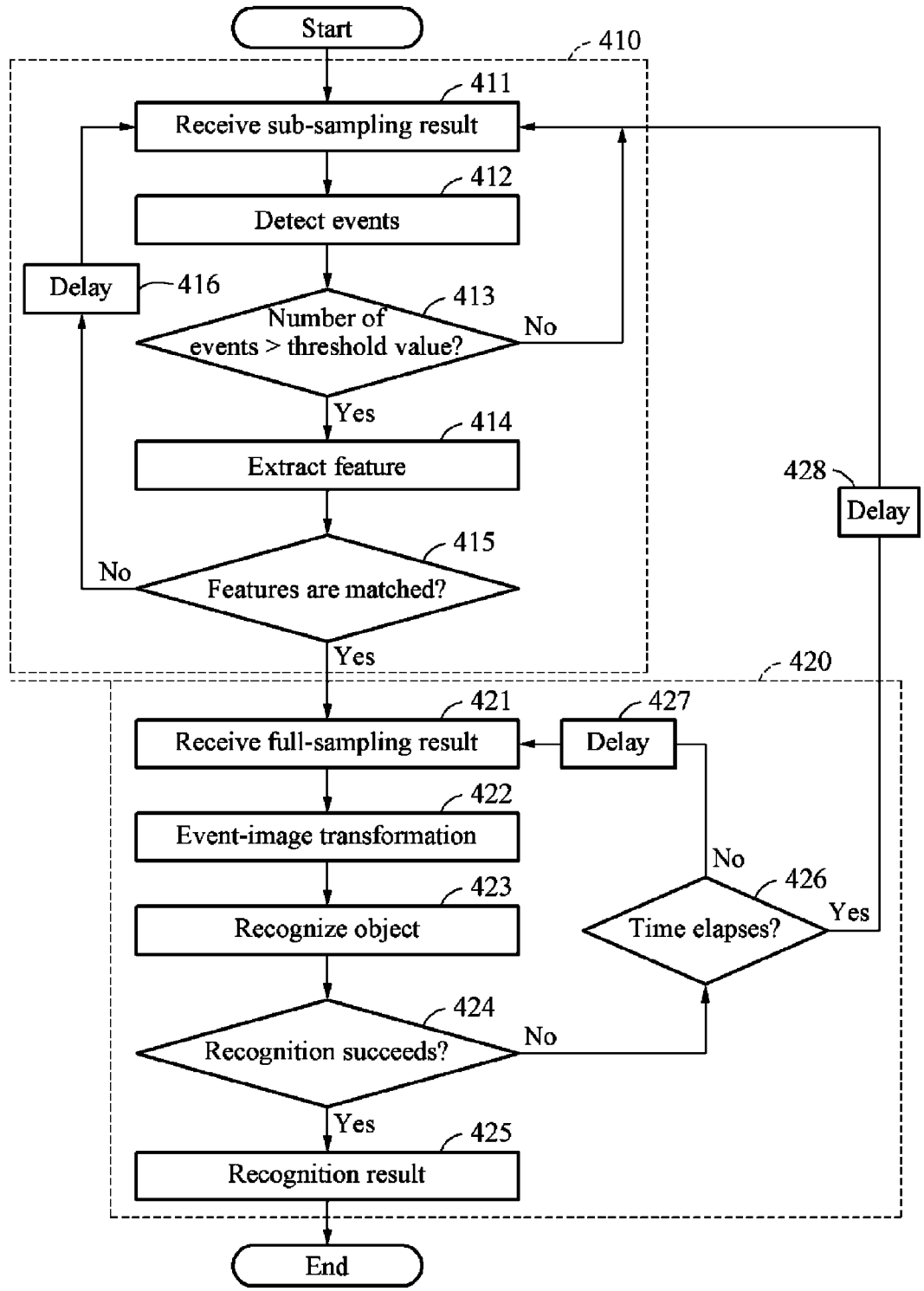
FIG. 4 is a diagram illustrating an operation of a processor according to an exemplary embodiment.

Referring to FIG. 4, the processor 130 may differently operate based on a mode of the event-based vision sensor 110. For example, the processor 130 may perform operation 410 for the first mode. In operation 411, the processor 130 may receive a sub-sampling result from the event-based vision sensor 110 that operates in the first mode. In operation 412, the processor 130 may detect events per unit time. The unit time may be set in advance or dynamically updated. The events per unit time may be events received during the unit time and each event may include position information and/or time information. The position information may indicate a position of a pixel corresponding to the relevant event signal and the time information may indicate time when the relevant event signal is generated.

In operation 413, the processor 130 may compare a number of events per unit time to a predetermined threshold value. As a result of the comparing in operation 413, when the number of the events per unit time is less than or equal to the predetermined threshold value, the processor 130 may return to operation 411 and receive another sub-sampling result.

In operation 414, as a result of the comparing in operation 413, when the number of the events per unit time is greater than the predetermined threshold value, the processor 130 may extract a feature from the events per unit time. The processor 130 may extract the feature based on the time information and/or the position information included in the events per unit time. For example, the processor 130 may extract a feature associated with a distribution of pixels corresponding to the events per unit time based on the position information included in the events per unit time.

In operation 415, the processor 130 may determine whether the extracted feature and a predetermined feature are matched. The predetermined feature may be a feature extracted in advance from an object to be recognized. The predetermined feature may be dynamically updated. For example, when the object recognition frequently fails in the second mode, a feature may be updated based on a relevant result.

When the extracted feature and the predetermined feature are determined not to be matched in operation 415, the processor 130 may return to operation 411 and receive another sub-sampling result. In this example, a delay may be applied in operation 416. A duration of the delay may be determined in advance or dynamically updated. For example, the duration of the delay may increase when a number of failures increases.

When the extracted feature and the predetermined feature are determined to be matched, the processor 130 may perform operation 420 for the second mode. In operation 421, the processor 130 may receive the full-sampling result from the event-based vision sensor 110 that operates in the second mode. In operation 422, the processor 130 may perform an event-image transformation. For example, the processor 130 may generate an image based on the second event signals. Hereinafter, detailed descriptions related to the event-image transformation will be provided with reference to FIGS. 5 through 9.

In operation 423, the processor 130 may recognize an object based on the generated image. Various schemes for recognizing an object based on an image may be applied in operation 423. For example, the processor 130 may recognize an object from an image using a learning-based classifier.

In operation 424, the processor 130 may determine whether the object recognition is successful. For example, the processor 130 may determine that the object recognition succeeds when the recognized object is classified to be one of pre-registered object types. Conversely, the processor 130 may determine that the object recognition fails when the recognized object does not correspond to any one of the pre-registered object types.

In operation 425, when the object recognition is determined to be successful, the processor 130 may output a recognition result. The recognition result may be an identification (ID) indicating an object type. Also, the processor 130 may perform an operation corresponding to the recognition result. For example, the processor 130 may perform an operation that unlocks a mobile terminal when a face of a user pre-registered in the mobile terminal is determined to be recognized.

In operation 426, when the object recognition is determined to be a failure, whether an allowable time for operating in the second mode elapses is determined. When the allowable time is determined not to be elapsed, the processor 130 may return to operation 421 and receive the full-sampling result. Here, a delay may be applied in operation 427. A duration of the delay may be determined in advance or dynamically updated. When the allowable time is determined to be elapsed, the processor 130 may return to operation 411 and receive the sub-sampling result. Here, a delay may be applied to operation 428. A duration of the delay may be determined in advance or dynamically updated. Based on operation 426, the processor 130 may exit from a loop of operation 420 for the second mode when the object recognition fails during the allowable time.

Figure 5:
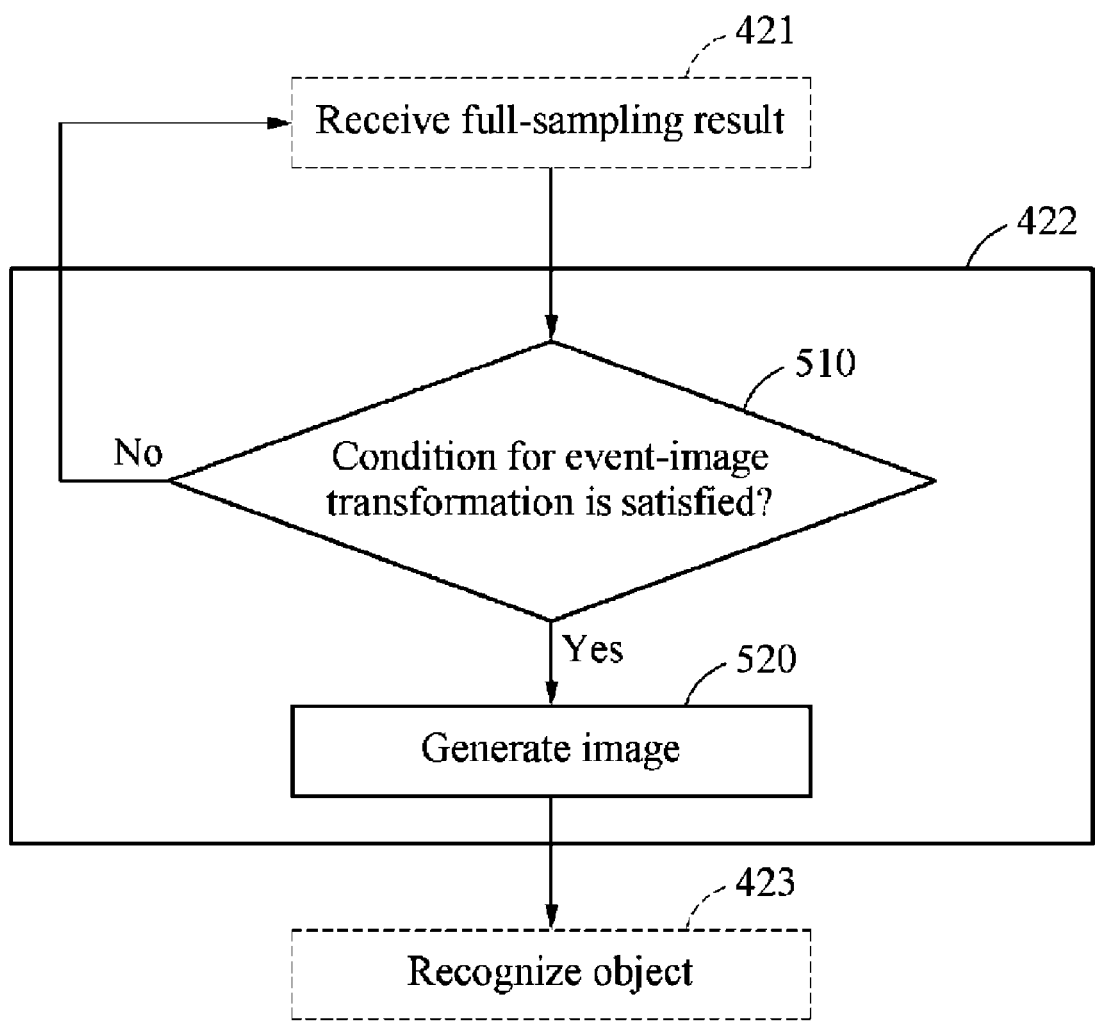
FIGS. 5, 6, 7, 8, 9A and 9B are diagrams illustrating an event-image transformation according to exemplary embodiments.

Hereinafter, descriptions related to the event-image transformation in operation 422 will be provided with reference to FIGS. 5 through 9. Referring to FIG. 5, in operation 510, the processor 130 may determine whether a condition for the event-image transformation is satisfied. Since the event-based vision sensor 110 outputs an event signal in response to a change in light or a movement of an object, a large number of event signals may be output during an identical time interval when the light changes fast or the object moves fast. Accordingly, when the event signals are collected based on a fixed time interval, the number of event signals collected based on the change in light or the movement of the object may be inappropriate.

In operation 520, since the processor 130 generates an image based on the collected event signals, quality of an image generated when the number of the collected event signals is inappropriate may decrease. The processor 130 may determine whether the number of event signals collected in operation 510 is appropriate. For example, the processor 130 may determine the number of collected event signals is appropriate based on a position relationship among the event signals. The position relationship among the event signals is a relationship among the positions corresponding to the event signals. For example, the position relationship among the event signals may include an appearance in which the positions of event signals are distributed, a degree of which the positions of event signals are dispersed, a degree of which the positions of event signals are concentrated, and the like. The processor 130 may determine whether the number of the collected event signals is appropriate by comparing the number of the collected event signals to a threshold value determined based on the position relationship among the event signals.

Figure 6:
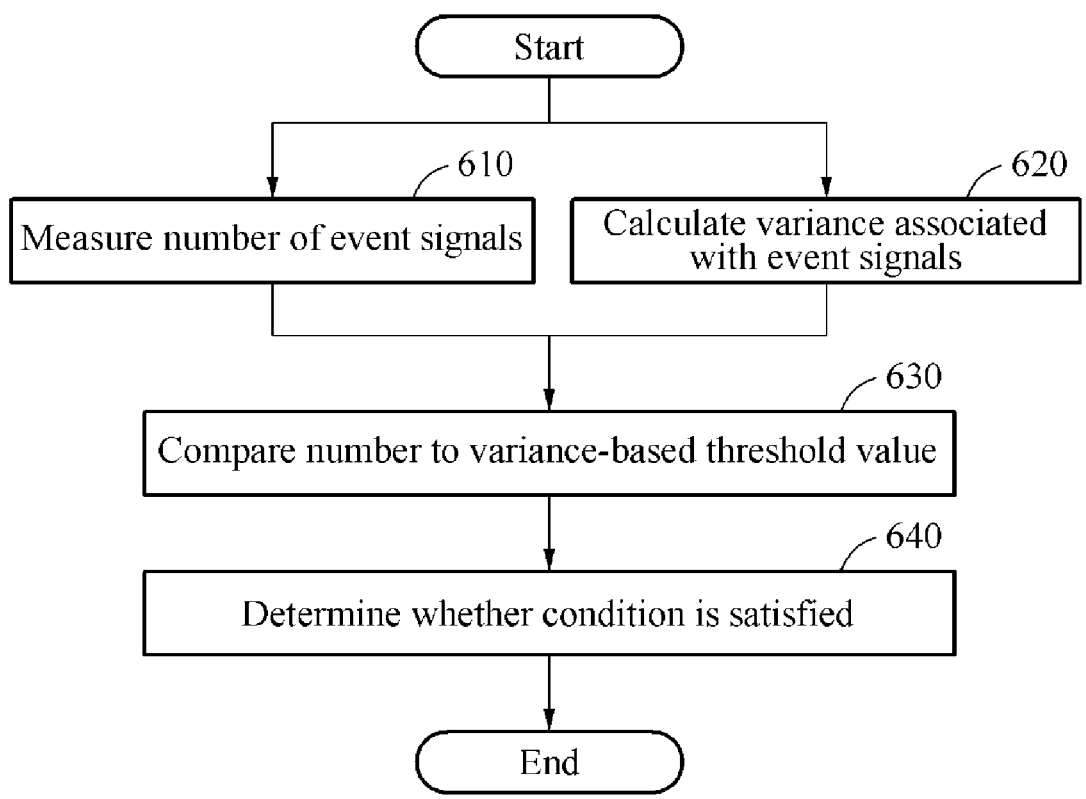
Figure 7:
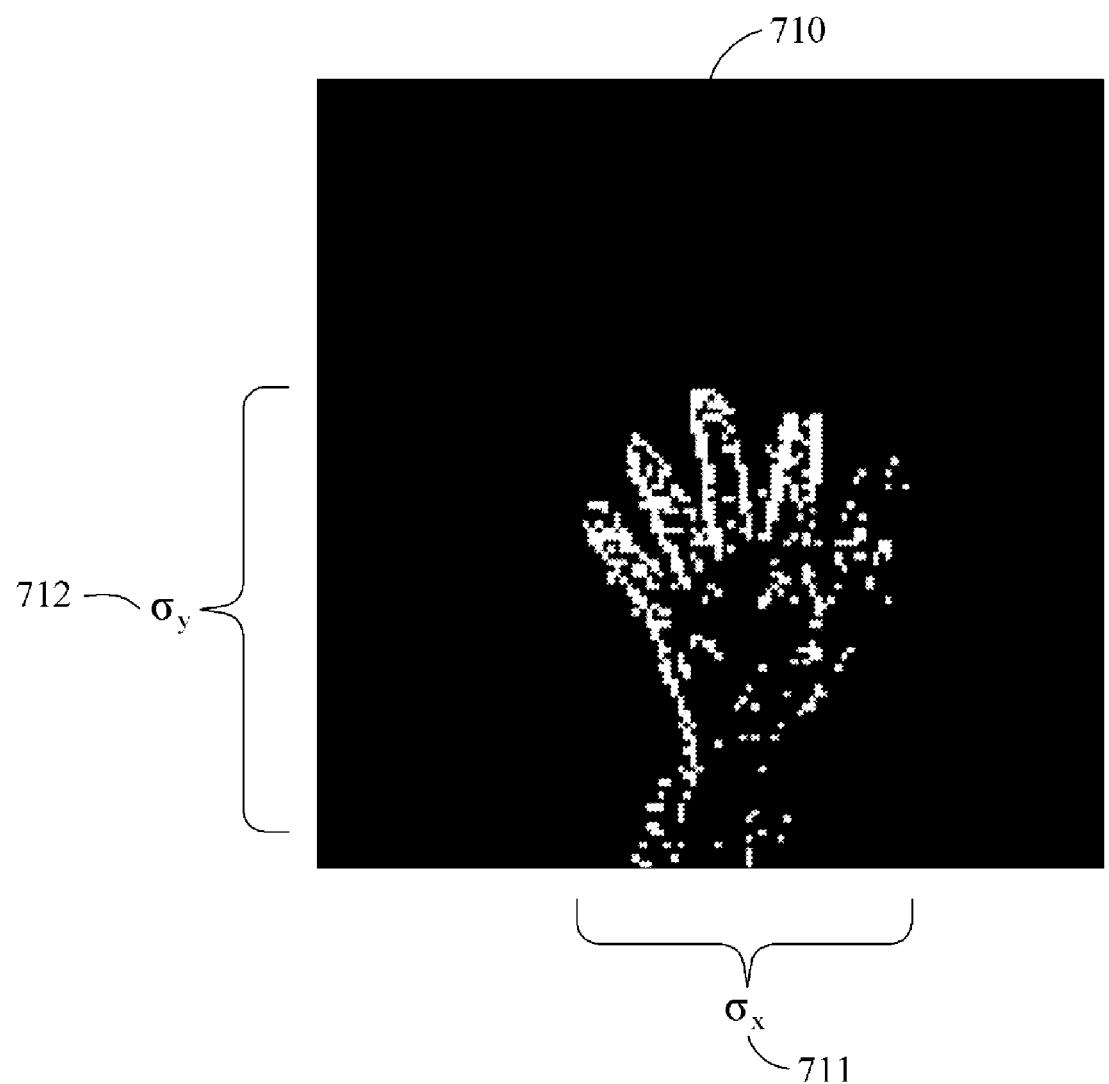

In an example, the processor 130 may determine whether a number of event signals collected based on a variance of the event signals is appropriate. Referring to FIG. 6, in operation 610, the processor 130 may measure the number of event signals. In operation 620, the processor 130 may calculate the variance associated with the event signals. The processor 130 may calculate a variance $\sigma_x$ of an x-axis direction and a variance $\sigma_y$ of a y-axis direction based on the position information included in the event signals. Referring to FIG. 7, a variance $\sigma_x$ 711 of the x-axis direction may correspond to a degree of which event signals 710 are distributed in the x-axis direction and a variance $\sigma_y$ 712 of the y-axis direction may correspond to a degree of which the event signals 710 are distributed in the y-axis direction.

In operation 630, the processor 130 may compare the number of event signals to a variance-based threshold value. The variance-based threshold value may be a threshold value determined based on a variance and refer to a function $f(\sigma_x, \sigma_y)$ of the variance $\sigma_x$ of the x-axis direction and the variance $\sigma_y$ of the y-axis direction. The function $f(\sigma_x, \sigma_y)$ may be set in various ways. For example, the function $f(\sigma_x, \sigma_y)$ may be set as Equation 1.

$$f(\sigma_x, \sigma_y) = \alpha \cdot \sigma_x \cdot \sigma_y \quad \text{[Equation 1]}$$

The processor 130 may use an algorithm of Table 1 in order to efficiently calculate Equation 1. In Table 1, $\alpha$ is assumed to be "2".

TABLE 1

```
reset the image canvas
alpha = 2
a = 0
b = 0
c = 0
d = 0
e = 0
f = 0
g = 0
h = 0
i = 0
do until a<alpha*e*i {
```

TABLE 1-continued

```
get next event's position (x,y)
a = a + 1
b = x - c
c = c + b / a
d = d + b * ( x - c )
e = sqrt( d / ( a - 1 ) )
f = y - g
g = g + f / a
h = h + f * ( y - g )
i = sqrt( h / ( a - 1 ) )
}
return an image from the events above
```

In operation 640, the processor 130 may determine whether a condition for the event-image transformation is satisfied. For example, when the number of event signals is greater than the function $f(\sigma_x, \sigma_y)$, the processor 130 may determine that the condition for the event-image transformation is satisfied.

In another example, the processor 130 may determine whether the number of event signals collected based on a solid level associated with the event signals is appropriate. The solid level may be a parameter indicating solidities of the event signals. For example, the solid level may be a reference indicating a degree of which the positions of the collected event signals are concentrated. Alternatively, the solid level may be a reference indicating a degree of which a form generated by the event signals is clear. In an example, the solid level may be a parameter that increases when a number of adjacent events corresponding to a predetermined event signal is greater than a predetermined number and decreases when the number of adjacent events corresponding to the predetermined event signal is less than the predetermined number. A position of the predetermined event signal may be determined based on position information of the predetermined event signal, and event signals included in a predetermined region adjacent to the determined position may be determined as adjacent event signals.

Figure 8:
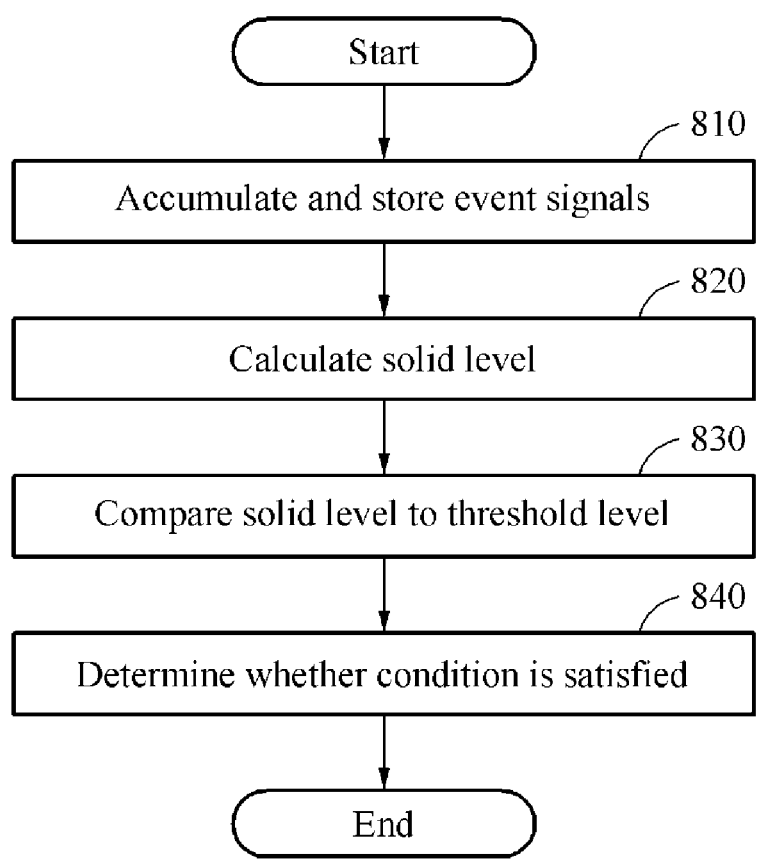

Referring to FIG. 8, in operation 810, the processor 130 may accumulate and store event signals. For example, the processor 130 may accumulate and store the event signals based on an event map including elements corresponding to the pixel array 111 of the event-based vision sensor 110. Values of each element included in the event map may be initialized as "0". The processor 130 may set a value of an element corresponding to a received event signal as "1" based on position information of the received event signal.

In operation 820, the processor 130 may calculate the solid level based on a result of the accumulating and storing. For example, the processor 130 may calculate a solid level s using Equation 2. The solid level s may be initialized as a predetermined value and then updated based on Equation 2. The solid level s may have a value between "0" and "1".

$$\Delta s = \gamma(H((\Sigma_i m(e,i)) - \theta) - s) \quad \text{[Equation 2]}$$

In Equation 2, $\Delta s$ is a variation of a solid level and $\gamma$ is a decision sensitivity. $\gamma$ may be a constant between "0" and "1". $\gamma$ is a Heaviside step function. When an internal value is greater than "0", H(•) is "1", and otherwise, may be "0".

m is an event map. When an $i^{th}$ neighboring element of an element corresponding to a predetermined event signal e in the event map m is set as "1", m(e, i) is "1", and otherwise, m(e, i) may be "0". $\theta$ is a threshold value.

In operation 830, the processor 130 may compare a solid level to a predetermined threshold level, for example, "0.4" and the like. In operation 840, the processor 130 may determine whether a condition for an event-image transformation is satisfied. For example, when the solid level is greater than a threshold level, the processor 130 may determine that the condition for the event-image transformation is satisfied.

Figure 9A:
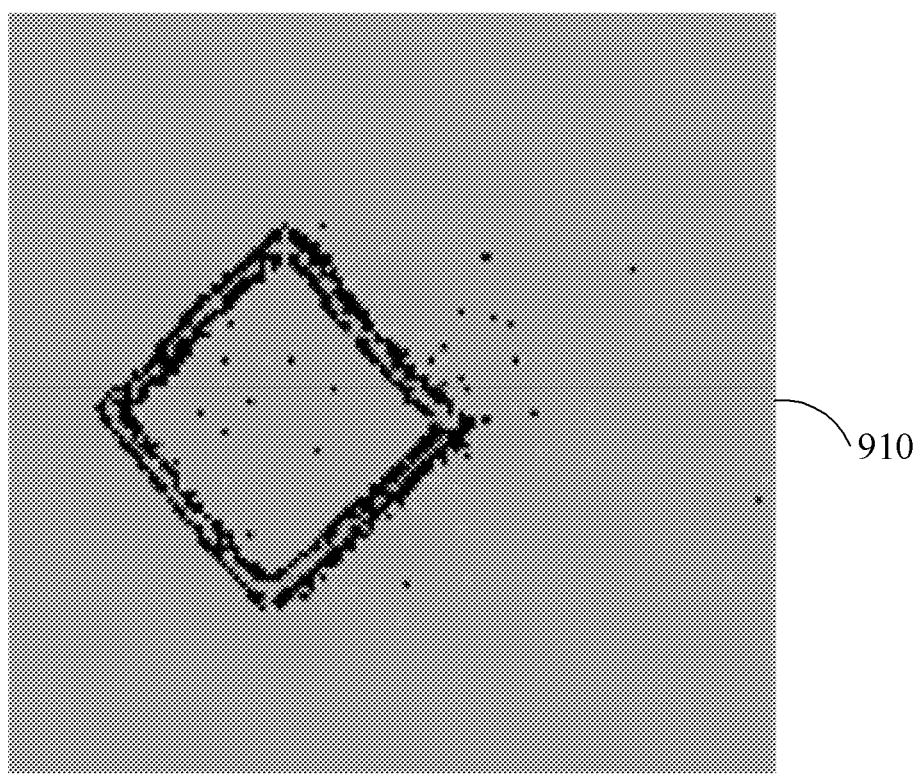
Figure 9B:
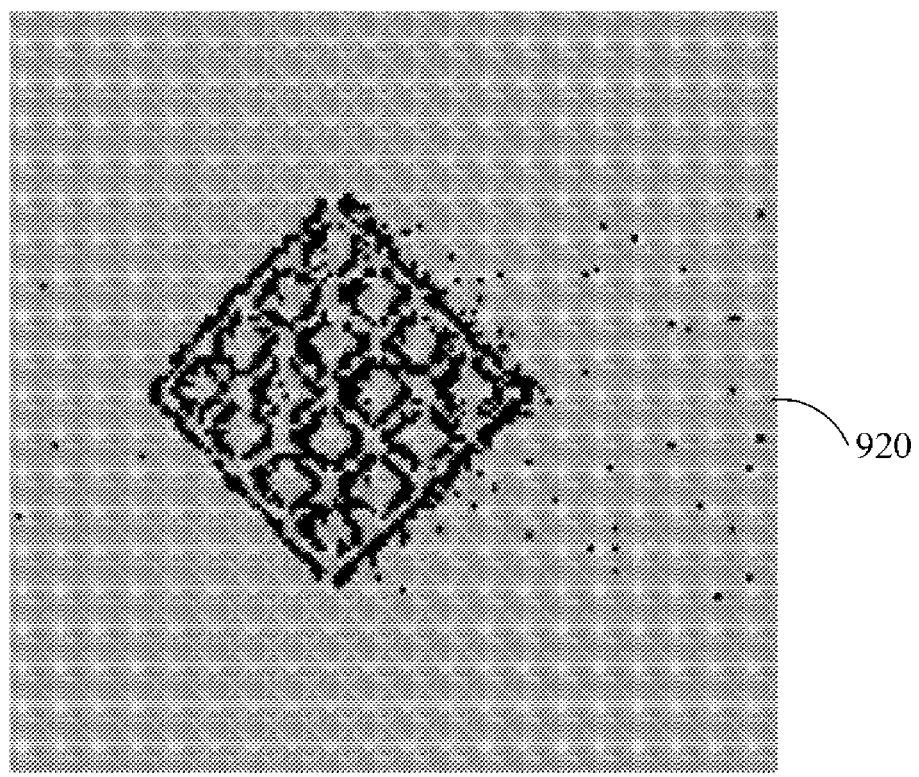

Referring to FIGS. 9A and 9B, the processor 130 may collect, based on a solid level, an appropriate number of event signals when an object has a simple pattern 910 and when an object has a complex pattern 920.

When an appropriate number of event signals are collected based on the aforementioned exemplary embodiments with reference to FIGS. 6 through 9B, an image may be generated in operation 520 in FIG. 5. Since the collected event signals include position information, points corresponding to the event signals may be disposed on a two-dimensional (2D) surface based on the position information. An image, for example, an image in FIG. 7 and/or images in FIGS. 9A and 9B, may be generated. The processor 130 may apply various image processing schemes, for example, noise filtering, edge detection, and the like, to the generated image, as necessary or desired.

Figure 10:
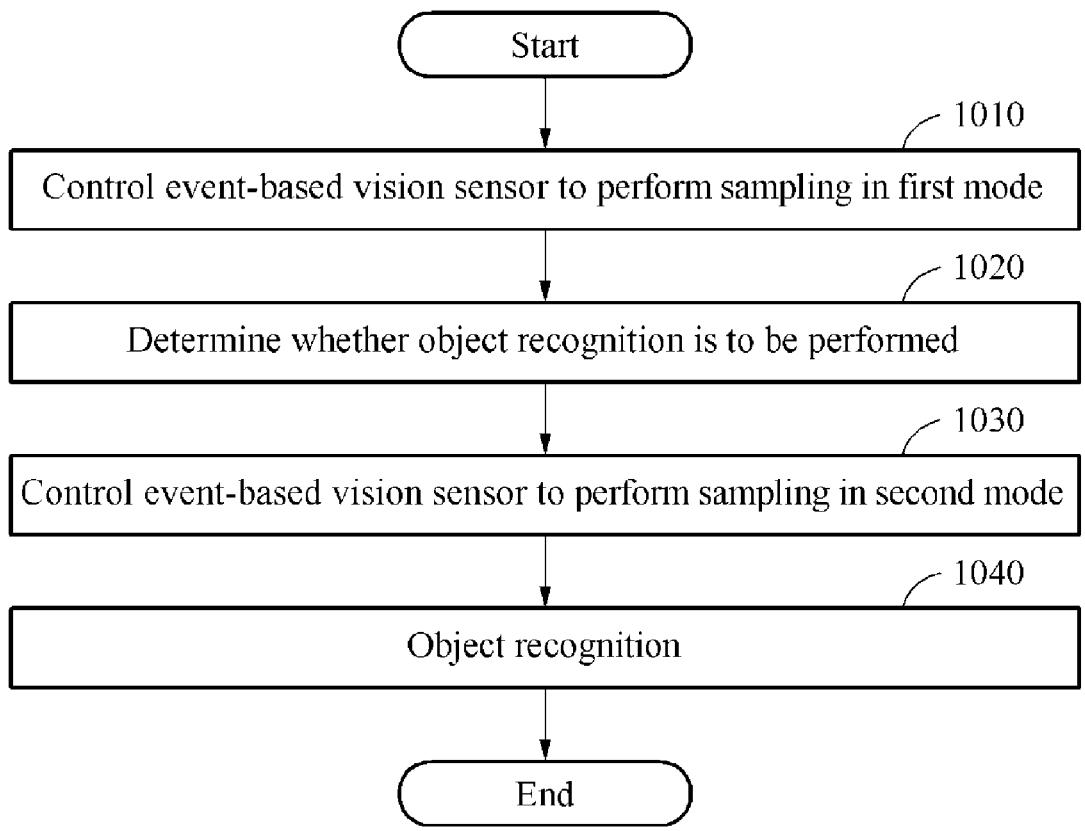
FIG. 10 is a flowchart illustrating an object recognition method according to an exemplary embodiment.

FIG. 10 is a flowchart illustrating an object recognition method according to an exemplary embodiment. Referring to FIG. 10, the object recognition method according to an exemplary embodiment may include operation 1010 of controlling an event-based vision sensor to perform sampling in a first mode, operation 1020 of determining whether object recognition is to be performed based on first event signals, operation 1030 of controlling the event-based vision sensor to perform sampling in a second mode in response to the determination that the object recognition is to be performed, and operation 1040 of performing the object recognition based on second event signals. Since technical features described with reference to FIGS. 1 through 9B may be directly applicable to each operation described in FIG. 10, a detailed description will be omitted for conciseness.

Figure 11:
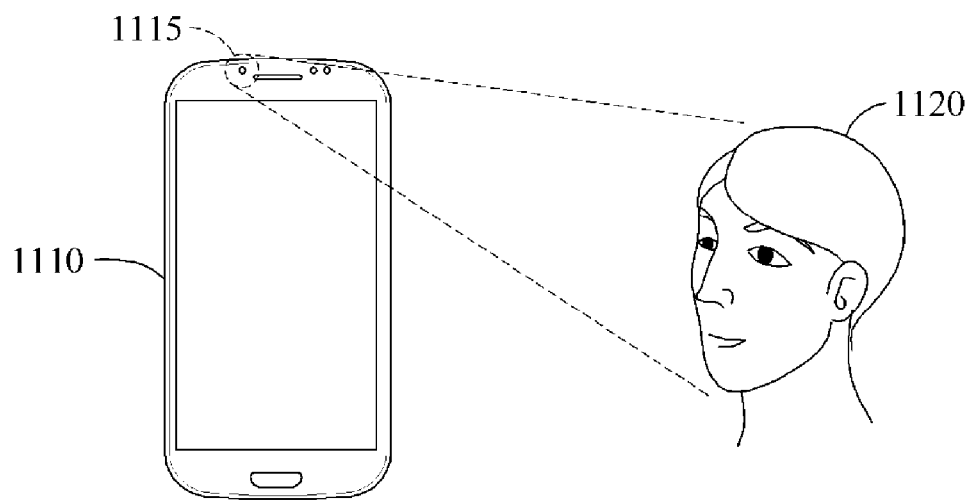
FIGS. 11 and 12 are diagrams illustrating a scenario of applying an object recognition scheme according to exemplary embodiments.
Figure 12:
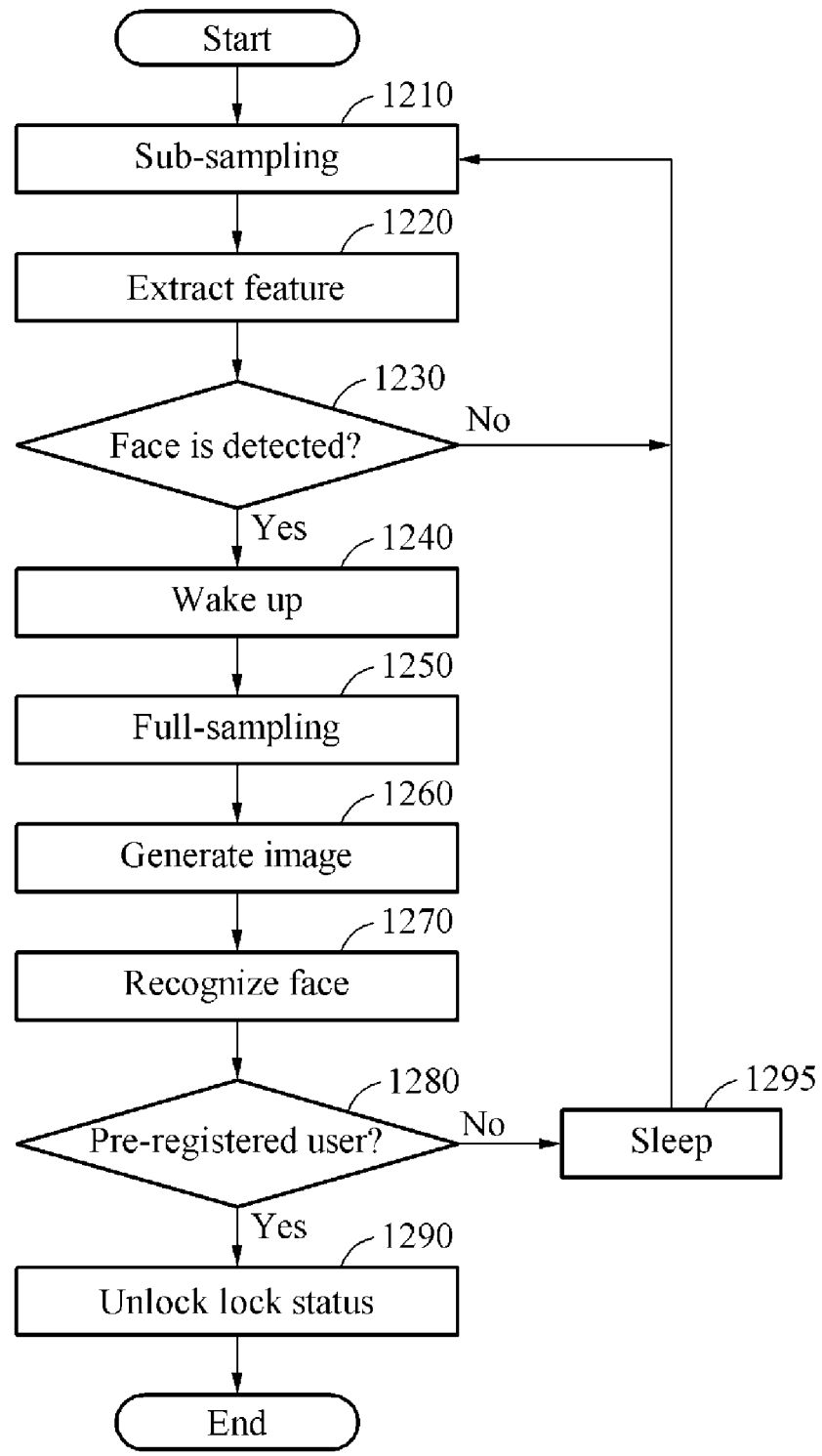

FIGS. 11 and 12 are diagrams illustrating a scenario applying an object recognition scheme according to exemplary embodiments. Referring to FIG. 11, the object recognition scheme may be applied to a mobile terminal, for example, a smartphone 1110 and the like. For example, the smartphone 1110 may include an event-based vision sensor 1115. The event-based vision sensor 1115 may correspond to the event-based vision sensor 110 in FIG. 1.

The smartphone 1110 may include a processor. The processor may perform an operation of the controller 100 and/or an operation of the processor 130 in FIG. 1. According to various considerations, the smartphone 1110 may include an exclusive hardware module corresponding to the controller 100 and/or the processor 130 in FIG. 1.

The smartphone 1110 may perform sub-sampling in lock status. The smartphone 1110 may detect a face 1120 of a user based on a sub-sampling result. The smartphone 1110 may perform full-sampling when the face 1120 of a user is detected, and may perform verification on the face 1120 of a user based on the full-sampling result. The smartphone 1110 may unlock the lock status based on a result of the verification.

Exemplary embodiments may provide technology for automatically verifying a user and unlocking the lock status in lieu of an extra input for unlocking the lock status. For example, user verification and unlocking may be performed based on an action of removing the smartphone 1110 from a pocket and directing the smartphone 1110 to a face. The technology may be referred to as always-on-face-unlock scheme. Since exemplary embodiments operate in low power based on sub-sampling at most time intervals in the unlock status, a power consuming issue of a mobile terminal may be prevented.

Referring to FIG. 12, in operation 1210, sub-sampling may be performed. The smartphone 1110 may be in a lock status or a sleep status. In operation 1220, a feature may be extracted based on a sub-sampling result. In operation 1230, whether a face is detected may be determined based on a feature extracting result. In operation 1240, when the face is determined to be detected, the smartphone 1110 may be woken up. For example, a display of the smartphone 1110 may be ON.

In operation 1250, full-sampling may be performed. In operation 1260, an image may be generated based on the full-sampling result. In operation 1270, a face of a user may be recognized based on the image. In operation 1280, whether a face recognition result corresponds to a pre-registered user is determined. In operation 1295, when the face recognition result does not correspond to the pre-registered user, the smartphone 1110 may return to the sleep status. In this example, the lock status may not be unlocked. In operation 1290, when the face recognition result corresponds to the pre-registered user, the lock status may be unlocked.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or the program instructions may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the exemplary embodiments are not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A method of recognizing an object, the method comprising:
    controlling an event-based vision sensor including pixels to perform sampling in a first mode and to output first event signals based on the sampling in the first mode;
    determining whether object recognition is to be performed based on the first event signals;
    controlling the event-based vision sensor to perform sampling in a second mode and to output second event signals based on the sampling in the second mode in response to the determining indicating that the object recognition is to be performed; and
    performing the object recognition based on the second event signals,
    wherein the controlling of the event-based vision sensor to perform the sampling in the first mode comprises blocking a portion of the pixels comprised in the event-based vision sensor from performing sampling.

2. The method of claim 1, wherein the first mode comprises a low power mode and the second mode comprises a normal power mode.

3. The method of claim 1, wherein the controlling of the event-based vision sensor to perform the sampling in the first mode further comprises:
    blocking event signals corresponding to the portion of pixels from being externally output from the event-based vision sensor.

4. The method of claim 3, wherein the portion of pixels is determined based on a temporal element, a spatial element, or a combination of the temporal element and the spatial element.

5. The method of claim 1, wherein the determining of whether the object recognition is to be performed comprises:
    measuring a number of the first event signals per unit time; and determining whether the object recognition is to be performed by comparing the number of the first event signals per unit time to a predetermined threshold value.

6. The method of claim 1, wherein the determining of whether the object recognition is to be performed comprises:
   extracting a feature from the first event signals; and
   determining whether the object recognition is to be performed by comparing the feature to a predetermined feature.

7. The method of claim 1, wherein the determining of whether the object recognition is to be performed comprises:
   measuring a number of the first event signals per unit time;
   comparing the number of the first event signals per unit time to a predetermined threshold value;
   extracting a feature from the first event signals when the number of the first event signals per unit time is higher than the predetermined threshold value; and
   determining whether the object recognition is to be performed by comparing the feature to a predetermined feature.

8. The method of claim 1, wherein the performing of the object recognition comprises:
   determining whether a predetermined condition associated with the second event signals is satisfied;
   generating an image based on the second event signals when the determining indicates that the predetermined condition is satisfied; and
   performing the object recognition based on the image.

9. The method of claim 8, wherein the determining of whether the predetermined condition is satisfied comprises:
   measuring a number of the second event signals;
   calculating a position relationship among the second event signals; and
   determining whether the predetermined condition is satisfied by comparing the number of the second event signals to a threshold value determined based on the number of the second event signals and the position relationship.

10. The method of claim 8, wherein the determining of whether the predetermined condition is satisfied comprises:
    measuring a number of the second event signals;
    calculating a variance associated with positions of the second event signals; and
    determining whether the predetermined condition is satisfied by comparing the number of the second event signals to a threshold value determined based on the number of the second event signals and the variance.

11. The method of claim 8, wherein the determining of whether the predetermined condition is satisfied comprises:
    accumulating and storing the second event signals;
    calculating a solid level associated with the second event signals based on a result of the accumulating and storing; and
    determining whether the predetermined condition is satisfied by comparing the solid level to a predetermined threshold value.

12. The method of claim 11, wherein the solid level is a parameter that increases when a number of adjacent event signals corresponding to the second event signals is higher than a predetermined number and decreases when the number of the adjacent event signals corresponding to the second event signals is less than the predetermined number.

13. The method of claim 1, wherein the event-based vision sensor outputs an event signal corresponding to a pixel detecting a change in light or a movement of an object among the pixels.

14. An apparatus configured to recognize an object, the apparatus comprising:
    an event-based vision sensor comprising pixels and configured to operate in a first mode and a second mode;
    a controller configured to control whether the event-based vision sensor operates in the first mode or the second mode; and
    a processor configured to determine whether object recognition is to be performed based on first event signals output from the event-based vision sensor when the controller controls the event-based vision sensor to operate in the first mode and perform the object recognition based on second event signals output from the event-based vision sensor when the controller controls the event-based vision sensor to operate in the second mode, wherein:
    in the first mode, the controller is configured to block a portion of the pixels from performing sampling.

15. The apparatus of claim 14, wherein:
    in the first mode, the controller is further configured to block event signals corresponding to the portion of pixels from being externally output from the event-based vision sensor.

16. The apparatus of claim 14, wherein the processor is configured to extract a feature from the first event signals and determine whether the object recognition is to be performed by comparing the feature to a predetermined feature.

17. The apparatus of claim 14, wherein the processor is configured to determine whether a predetermined condition associated with the second event signals is satisfied, generate an image based on the second event signals when the predetermined condition is satisfied, and perform the object recognition based on the image.

18. The apparatus of claim 15, wherein the processor is configured to measure a number of the second event signals, calculate a variance associated with positions of the second event signals, and determine whether the predetermined condition is satisfied by comparing the number of the second event signals to a threshold value determined based on the number of the second event signals and the variance.

19. The apparatus of claim 15, wherein the processor is configured to accumulate and store the second event signals, calculate a solid level associated with the second event signals based on a result of the accumulated and stored second event signals, and determine whether the predetermined condition is satisfied by comparing the solid level to a predetermined threshold value.

20. The apparatus of claim 14, wherein the event-based vision sensor is configured to output an event signal corresponding to a pixel detecting a change in light or a movement of an object among the pixels.

* * * * *